United States Patent Office 3,281,455
Patented Oct. 25, 1966

3,281,455
PROCESS FOR THE PREPARATION OF CARBONYL COMPOUNDS CONTAINING A HINDERED PHENOL GROUP
David H. Steinberg, Bronx, N.Y., assignor to Geigy Chemical Corporation, Greenburgh, N.Y., a corporation of Delaware
No Drawing. Filed Apr. 29, 1963, Ser. No. 276,193
9 Claims. (Cl. 260—473)

This invention relates to a novel and useful process for the preparation of certain 3,5-dialkyl-4-hydroxyphenyl substituted organic compounds. In particular, the invention concerns the method of preparation of compounds of the Formula I:

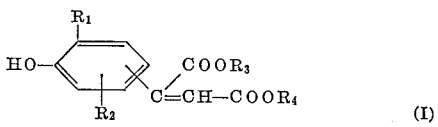

(I)

wherein
$R_1$ and $R_2$ are each independently alkyl, preferably tertiary alkyl having 4 to 8 carbon atoms,
$R_3$ and $R_4$ are each independently alkyl, e.g. methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc.

In particular also, the invention relates to the method of preparation of compounds of the Formula II:

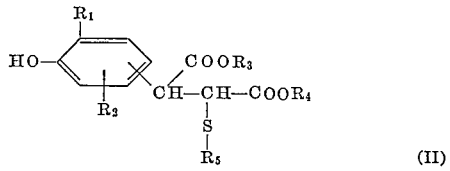

(II)

where
$R_1$ and $R_2$ are each independently alkyl, preferably tertiary alkyl having 4 to 8 carbon atoms,
$R_3$, $R_4$ and $R_5$ are each independently alkyl, e.g. methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc.

The preparation of the compounds of the Formula I is accomplished according to a new process whereby a compound of the Formula III:

$$R_3OOC-C\equiv COOR_4 \qquad (III)$$

is reacted with a compound of the Formula IV:

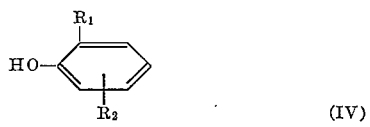

(IV)

the symbols $R_1$, $R_2$, $R_3$ and $R_4$ being as defined for Formula I above. This reaction may take place in presence or absence of solvent, with basic catalysts. A useful solvent is tertiary butanol. A useful catalyst is potassium tertiary butoxide.

The preparation of the compounds of the Formula II is accomplished by reacting a compound of the Formula I with an alkyl mercaptan, preferably having from one to twenty-four carbon atoms therein, e.g. n-octadecylmercaptan. A basic catalyst such as sodium methylate is useful, and a solvent such as methanol may also be employed.

An object of this invention is to provide a novel chemical process for preparing the compounds of the Formula I. A further object is to provide a process which comprises contacting a 3,5-dialkyl-4-hydroxybenzene compound, suitable to yield a derivative of the Formula I above, with an appropriate compound of the Formula III (hereinabove) in the presence of a base catalyst and a solvent, such as a difficultly esterifiable alcohol, to yield the desired organic compound of the Formula I. The difficultly esterifiable alcohol is preferably a lower alkanol, especially a tertiary lower alkanol, e.g. t-butanol, t-pentanol, t-hexanol, t-heptanol, t-octanol. In this specification "lower" alkanols have up to 8 carbon atoms. Other objects of this invention, e.g. the preparation of compounds of the Formula II, will be apparent from the description and specification which follows.

It is, indeed, an object of the invention to provide novel compounds which are useful in the stabilization of organic material such as polypropylene, which is subject to degradation. The novel compounds which are useful in stabilizing organic material, in particular, polypropylene, are the compounds of the Formulae I and II hereinabove.

Materials which are stabilized with the stabilizer compounds prepared according to the invention include polyolefins, especially synthetic resins such as polystyrene, polypropylene, polybutylene and polyethylene. Hydrocarbon material, lubricating mineral oil, gasoline, fatty oils and waxes, etc. are also stabilized. Elastomeric material, especially mixtures or combinations of elastomers and other polymers, e.g. high impact polystyrene containing polybutadiene, are all contemplated as materials for stabilization according to the invention.

In general, the stabilizers prepared according to the invention are employed in an amount of from about 0.005% to about 10% by weight based upon the stabilized composition. In polypropylene, amounts of from about 0.05% to about 5% by weight are advantageous with from about 0.1% to about 1% by weight being especially preferred. In hydrocarbon oils amounts of from about 0.05% to about 5% by weight are especially useful. In high impact polystyrene 0.05% to 5% by weight of stabilizer is preferred. (All the foregoing percents by weight are based on the stabilized composition.)

The compounds III and IV and the base catalyst are reacted in a suitable solvent which can be either one of the reacting compounds III or IV which may or may not be present in equimolar amounts, or an auxiliary solvent which may be anhindered alcohol, i.e. preferably a difficultly esterifiable alcohol such as a tertiary alkanol, e.g. tertiary butanol, or an ether type solvent such as tetrahydrofuran. Compounds of the Formula III are prepared by known methods, such as, for example those disclosed in U.S. Patent 2,786,022.

Compounds of the Formula IV are prepared by alkylation of phenol and by other known methods. Certain compounds of the Formula IV are available commercially, e.g. 2,6-di-tert.-butylphenol. Examples of compounds of the Formula IV which are useful are the following:

6-t-butyl-o-cresol, 6-(1,1,3,3,-tetramethylbutyl) o-cresol, 2-sec-butyl-6-t-butylphenol, 2,6 - bis(1,1 - dimethyl- n - propyl)-phenol, 2,6-bis(1-methyl-n-nonyl)phenol, 2-(1,1,3,3-tetramethyl-n-butyl)-6-methylphenol, etc.

REACTION CONDITIONS.—PREPARATION OF FORMULA I

The following remarks refer to conditions in preparation of compounds of the Formula I.

A wide range of temperatures from about 20° C. (at atmospheric pressure) to about 100° C. (at atmospheric pressure) may be employed to bring about the desired addition. The preferred range of temperatures is from about 30° C. to about 60° C.

The reaction may be conducted at 1:1 molar concentrations of the two reactants III and IV. Large excesses of the acetylene derivative (III) should be avoided.

Any suitable catalyst concentrations, e.g. from 0.01 to 100 mole percent, based on the phenol IV concentration, may be employed, though preferred are stoichiometric or equimolar amounts of the catalyst.

Any suitable mode of addition may be employed although it has been found most practical to add the acetylene derivative (III) last.

Optimum results are obtained when air or oxygen is excluded or substantially reduced in amount from the atmosphere immediately in contact with the reactants. This can be accomplished in various ways, e.g. by blanketing the reactants in the reaction vessel with an inert gas such as nitrogen. Alternatively, a reaction vessel is chosen whereby the reactants, solvent, catalyst, etc. substantially fill the vessel. In a reaction in a closed vessel, air may be swept out with an inert gas such as nitrogen before introducing the reactants, etc. into the reaction vessel.

The reaction of III with IV is preferably carried out in the presence of a base catalyst such as a quaternary ammonium base, e.g. benzyltrimethylammonium methoxide or such as alkali metal amides, e.g. sodamide, or alkali metal alkoxides—preferably an alkali metal lower alkoxide, e.g. sodium or potassium methoxide, ethoxide, n-propoxide, isopropoxide, n-butoxide, sec-butoxide, t-butoxide, pentoxide, hexoxide, heptoxide, octyloxide, etc., or alkali metal hydroxides, e.g. sodium or potassium hydroxide. The alkaline earth metal alkoxides or hydroxides are also useful.

REACTION CONDITIONS.—PREPARATION OF FORMULA II

In preparing compounds of the Formula II, the reaction conditions are as follows. In general, the same remarks as above, with respect to reaction conditions for the preparation of compounds of the Formula I, are applicable to the reaction conditions for the preparation of compounds of the Formula II, except as follows.

Other possible solvents include polar solvents miscible with organic materials, e.g. ketones.

As to the starting material alkyl mercaptans, these are generally available. They may be prepared in known ways, e.g. by the reaction of an alkylhalide and an alkali metal hydrosulfide.

Useful reaction temperatures are from about 15° C. to about 45° C., preferably from about 20° C. to about 30° C.

The reactant concentrations are similar, e.g. equimolar quantities are usually preferred, although at times an excess of mercaptan may be preferable.

The preferred quantity of catalyst is equimolar, based upon the phenol derivative, although other concentrations may be used.

The mode of addition may be as above described.

The catalysts described above may also be usefully employed in the present aspect of the invention, e.g. quaternary ammonium bases.

The inert atmosphere is not necessary for this reaction.

The following examples illustrate the invention but are not limiting, parts are by weight unless otherwise noted and temperatures are in degrees centigrade. The relationship between parts by weight and parts by volume is as that of grams to cubic centimeters.

*Example 1.—Dimethyl 2-(3',5'-di-tert.butyl-4'-hydroxyphenyl)-2-butendioate*

To a solution of 6.78 parts potassium tert.butoxide in 125 parts by volume of dry tert. butanol is added 37.1 parts of molten 2,6-di-tert.butylphenol while stirring and maintaining a nitrogen atmosphere. To the resulting green mixture is added a solution of 10.65 parts dimethyl acetylene dicarboxylate in 30 parts by volume of dry tert. butanol over a 30 minute interval with continuous stirring.

The resulting mixture is stirred and heated at 55–60° for 20.5 hours. It is then cooled, acidified with dilute hydrochloric acid and treated with ether and water. After the phases are separated, the aqueous phase is extracted with two fresh portions of ether. The original ether solution and ethereal extracts are combined, washed with water, then with saturated sodium chloride and dried over sodium sulfate. After removal of the drying agent, stripping of the solvent gives 44.0 parts of di-methyl 2-(3',5'-di-tert.butyl-4'-hydroxyphenyl) - 2 - butenedioate, which has a boiling point of 184°/0.8 mm. Crystallization from cyclohexane-hexane gives the product as a solid, having melting point 142–143°.

*Example 2.—Dimethyl 2-n-octadecylthio-3-(3',5'-di-tert.butyl-4'-hydroxyphenyl)butanedioate*

To a solution of 7.18 parts of n-octadecyl mercaptan, 1.35 parts of sodium methylate in 60 parts by volume of methanol is added a solution of 8.71 parts of dimethyl 2-(3',5'-di-tert.butyl-4'-hydroxyphenyl)-2-butenedioate in 50 parts by volume of methanol while stirring at ambient temperatures. The mixture is stirred at room temperature overnight, and the following morning it is taken up in benzene and ether, neutralized with some glacial acetic acid, washed with water, saturated sodium chloride and dried over sodium sulfate. After filtering to remove the drying agent stripping of the solvents gives 14.6 parts of di-methyl 2-n-octadecylthio - 3-(3',5'-di-tert.butyl-4'-hydroxyphenyl)butane-dioate. Crystallization from 95% ethanol gives the product as a white solid having melting point 86–88°.

What is claimed is:

1. Process for the preparation of compounds of the formula:

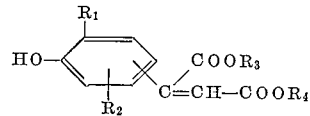

wherein $R_1$, $R_2$, $R_3$, and $R_4$ are each independently alkyl, said process comprising reaction of a compound of the formula $$R_3OOC-C{\equiv}C-COOR_4$$

with a compound of the formula

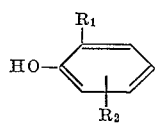

wherein $R_1$, $R_2$, $R_3$ and $R_4$ are independently alkyl in the presence of a basic catalyst selected from quaternary ammonium bases, alkali metal alkoxides, hydroxides or amides and alkaline earth metal alkoxides or hydroxides and at a temperature of from about 20° C. to about 100° C.

2. Process according to claim 1, wherein $R_1$ is tertiary alkyl having 4 to 8 carbon atoms.

3. Process according to claim 1, wherein $R_1$ and $R_2$ are each tertiary alkyl having 4 to 8 carbon atoms.

4. Process according to claim 1, wherein $R_1$ and $R_2$ are each tertiary butyl.

5. Process according to claim 1, wherein $R_3$ and $R_4$ are alkyl having 1 to 24 carbon atoms.

6. Process according to claim 1, wherein $R_1$ and $R_2$ are tertiary alkyl having 4 to 8 carbon atoms and $R_3$ and $R_4$ are each alkyl having 1 to 24 carbon atoms.

7. Process according to claim 1 wherein the reaction is caried out in the presence of a solvent selected from a tertiary alkanol or an ether.

8. Process according to claim 7, wherein the solvent is tertiary butanol and the catalyst is potassium tertiary butoxide.

9. Process for the preparation of dimethyl 2-(3',5'-di-tert.butyl-4'-hydroxyphenyl)-2-butenedioate, wherein 2,6-di-tert.butylphenol is reacted with dimethyl acetylene dicarboxylate in the presence of potassium tertiary butoxide in tertiary butanol solvent at a temperature of from about 20° C. to about 100° C.

References Cited by the Examiner

UNITED STATES PATENTS

| | | | |
|---|---|---|---|
| 2,213,717 | 9/1940 | Poizat et al. | 260—473 |
| 2,831,898 | 4/1958 | Ecke et al. | 260—624 |
| 3,002,992 | 10/1961 | Wood | 260—473 |
| 3,040,086 | 6/1962 | Miller | 260—470 |
| 3,080,415 | 3/1963 | Habicht | 260—470 |

LORRAINE A. WEINBERGER, *Primary Examiner.*

DANIEL D. HORWITZ, S. B. WILLIAMS,
*Assistant Examiners.*

UNITED STATES PATENT OFFICE
CERTIFICATE OF CORRECTION

Patent No. 3,281,455                            October 25, 1966

David H. Steinberg

It is hereby certified that error appears in the above numbered patent requiring correction and that the said Letters Patent should read as corrected below.

Column 1, line 52, for "$R_3OOC-C\equiv COOR_3$" read -- $R_3OOC-C\equiv C-COOR_4$ --.

Signed and sealed this 5th day of September 1967.

(SEAL)
Attest:

ERNEST W. SWIDER                                  EDWARD J. BRENNER
Attesting Officer                                          Commissioner of Patents